United States Patent
Wise et al.

[11] Patent Number: 5,826,185
[45] Date of Patent: Oct. 20, 1998

[54] CELLULAR PHONE SYSTEM WHEREIN THE AIR TIME USE IS PREDETERMINED

[75] Inventors: Andrew Wise; Ted G. Rich, both of Glendale, Ariz.

[73] Assignee: Banana Cellular, Inc., Phoenix, Ariz.

[21] Appl. No.: 699,168

[22] Filed: Aug. 19, 1996

Related U.S. Application Data

[63] Continuation of Ser. No. 340,738, Nov. 16, 1994, abandoned.

[51] Int. Cl.⁶ ........................................................ H04Q 7/20
[52] U.S. Cl. .......................... 455/405; 455/406; 455/408; 379/114
[58] Field of Search ............................ 455/405–411, 422, 455/558; 379/111, 112, 114, 121, 122, 144, 283, 339

[56] References Cited

U.S. PATENT DOCUMENTS

| | | | |
|---|---|---|---|
| 4,776,000 | 10/1988 | Parienti | 455/407 |
| 5,109,401 | 4/1992 | Hattori et al. | 379/58 |
| 5,138,650 | 8/1992 | Stahl et al. | 379/61 |
| 5,148,472 | 9/1992 | Freese et al. | 379/59 |
| 5,509,056 | 4/1996 | Ericsson et al. | 455/407 |
| 5,722,067 | 2/1998 | Fougnies et al. | 455/406 |
| 5,732,346 | 3/1998 | Lazaridis et al. | 455/406 |

*Primary Examiner*—Dwayne D. Bost
*Assistant Examiner*—Nay Maung
*Attorney, Agent, or Firm*—Fish & Richardson P.C.

[57] ABSTRACT

A cellular phone system in which a cellular phone user (CPU) has a cellular phone with a predetermined amount of available airtime. The CPU prepays for a particular number of airtime units. When a cell site receives a call from the CPU, the cell site communicates with a mobile telecommunications switching office (MTSO), which recognizes a unique serial number from the cellular phone. The MTSO directs the call to a prepaid airtime transaction tracking interface (PATTI). The PATTI then checks whether the CPU's account has any available airtime units and may indicate the number of units to the CPU. If none, the PATTI does not answer the call; otherwise, the PATTI connects the call and deducts airtime units until the call is disconnected.

28 Claims, 16 Drawing Sheets

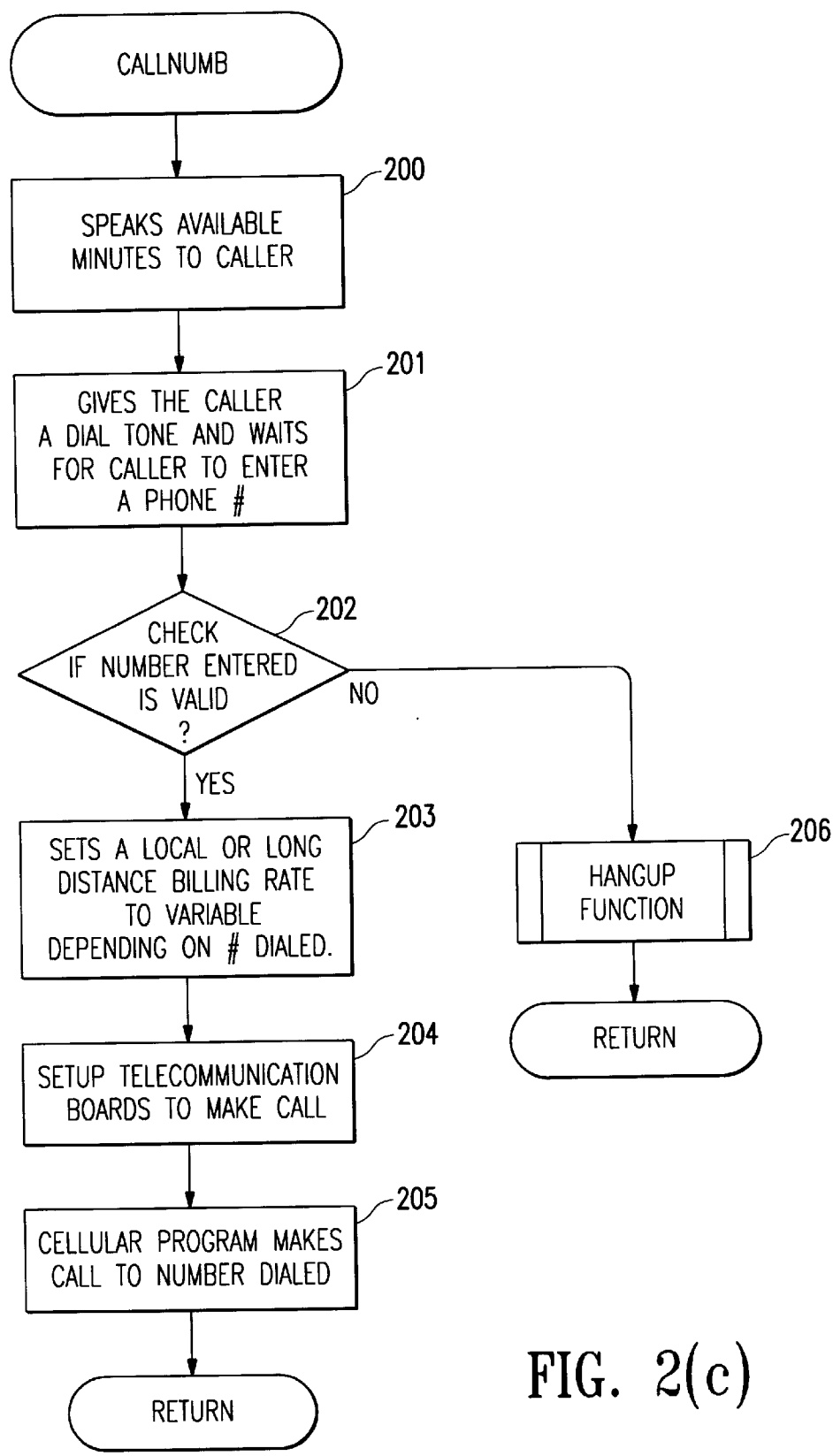

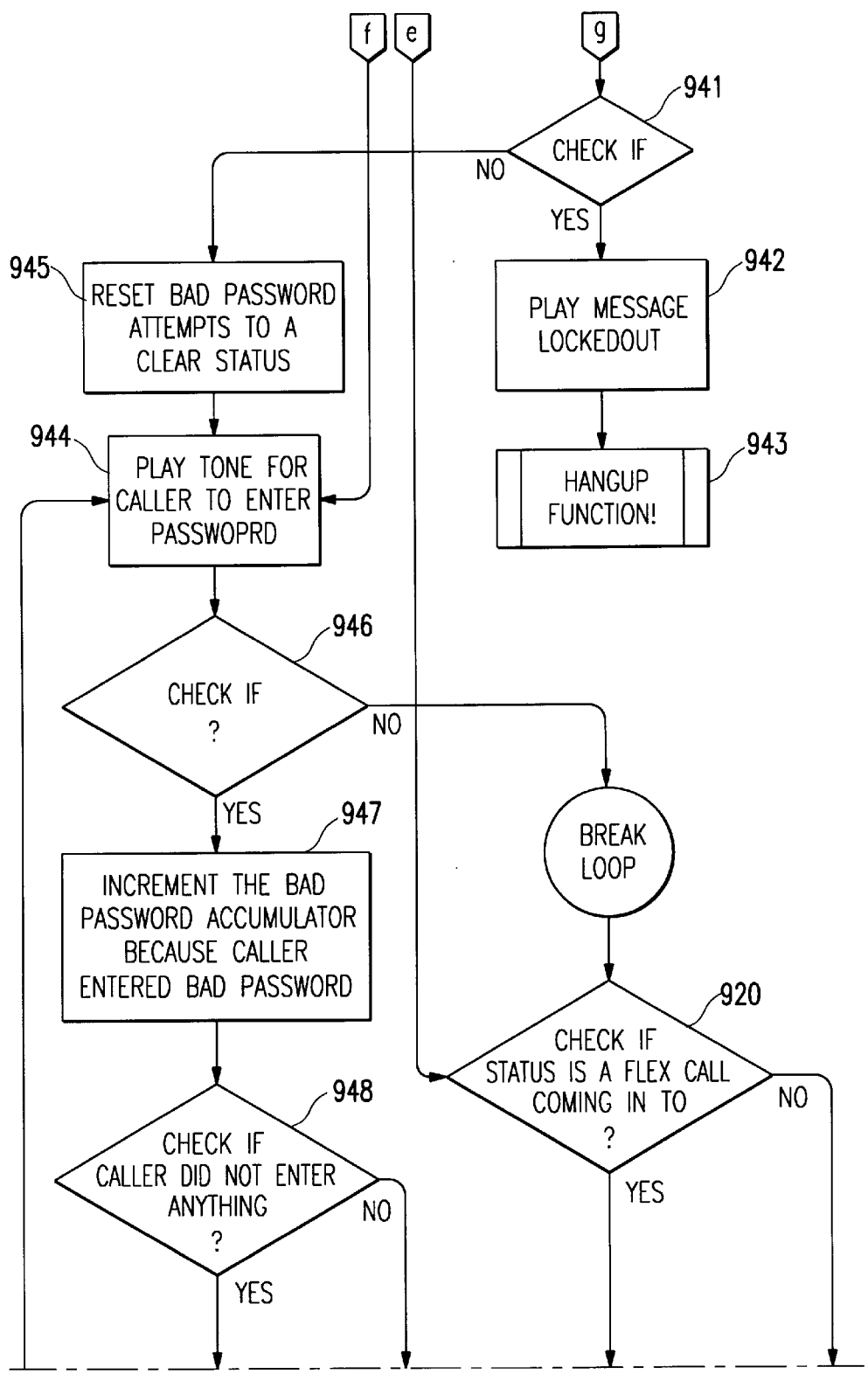
FIG. 2(1-1)

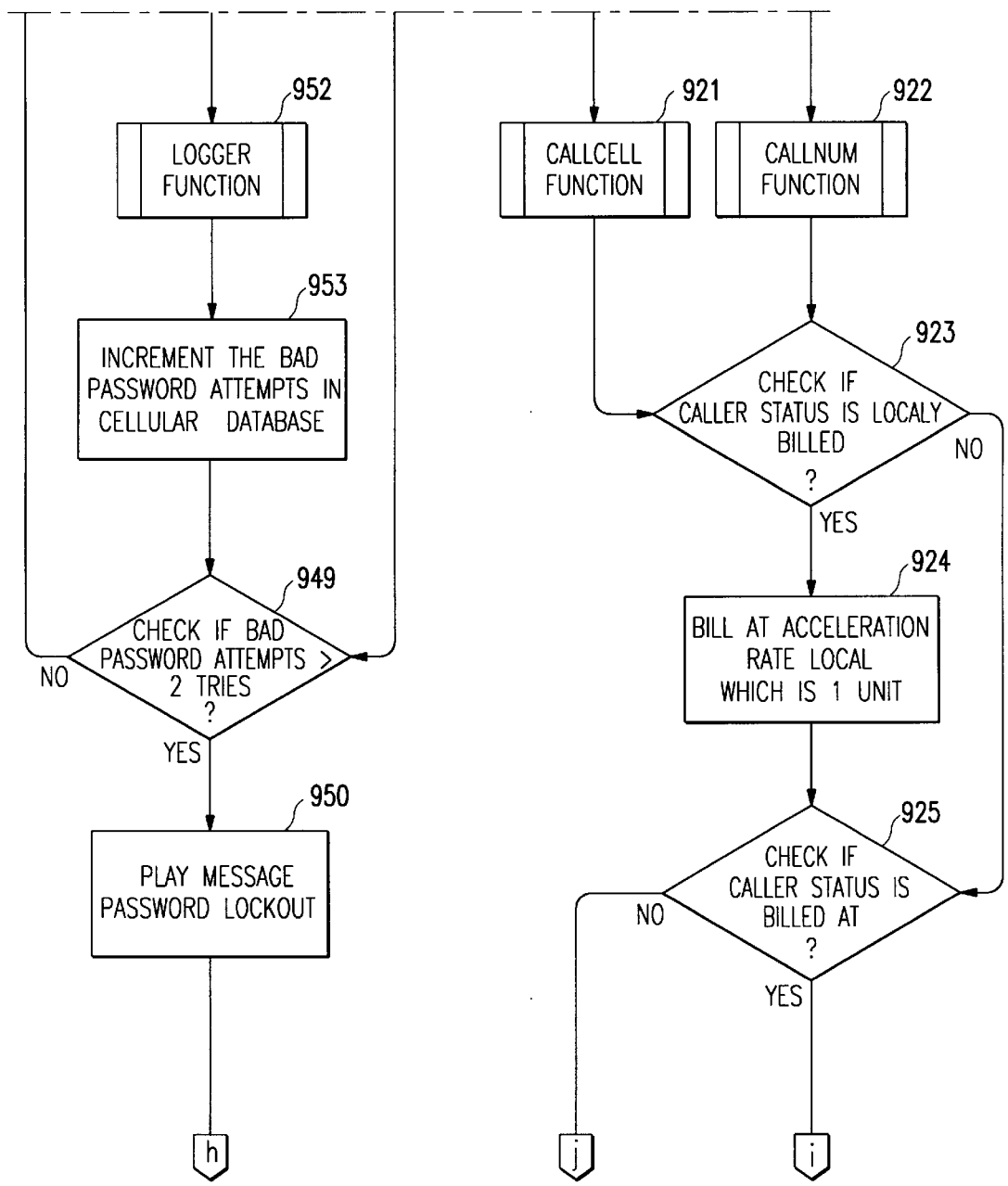
FIG. 2(1-2)

CELLULAR PHONE SYSTEM WHEREIN THE AIR TIME USE IS PREDETERMINED

This is a continuation of application Ser. No. 08/340,738, filed Nov. 16, 1994, now abandoned.

BACKGROUND OF THE INVENTION

1. Field of the Invention

The present invention provides a cellular phone system wherein the amount of air time available is based on the amount pre-paid by the cellular phone user.

2. Description of the Prior Art

The use of cellular telephones has rapidly increased in the last decade. Typically, a user buys the cellular phone and has a pre-selected serial number entered into the telephone at the time of purchase. In connection with the cellular phone company servicing a particular area, once the user's account number is properly programmed in the company's computer system, the user is able to make and receive telephone calls using the cellular phone. The user then is typically billed monthly for the air time spent making outgoing phone calls or receiving incoming phone calls. The user is expected to pay the bill in a manner typical of how payments are currently made for general telephone service.

However, there is a group of potential users which normally would not have access to cellular telephone service. For example, some people may not have established credit at the time when use of a cellular phone is desired, therefore making that person potentially unavailable to either purchase the cellular phone and/or the cellular service. In addition, there are many occasions where a consumer only desires to use the cellular phone for limited periods of time and has no desire to purchase the cellular phone and to incur the monthly costs for the usage and service. For example, a couple on vacation may want access to a cellular phone during the vacation period in order to keep in contact with family members at home.

In these circumstances wherein the use of a cellular telephone is only desired for short periods of time and wherein the establishment of an account with the local cellular company would be difficult to accomplish, it would be desirable if a system is provided which allows a user to rent a cellular phone and prepay a certain dollar amount corresponding to a predetermined amount of cellular phone air time.

SUMMARY OF THE PRESENT INVENTION

The present invention provides a cellular telephone system wherein air time use is controlled in accordance with the amount of money prepaid by the cellular phone user (CPU).

The CPU is provided with a predetermined amount of air time by prepaying the system operator an amount corresponding to a predetermined number of air time units (minutes and/or hours), the operator then programs the system accordingly.

A CPU initiates a phone call by pressing the SEND button on the cellular phone. When the cell site receives the signal from the cellular phone, it communicates with the mobile telecommunications switching office (MTSO). The MTSO recognizes the unique electronic serial number from the cellular phone and is programmed to direct the call, via a telephone line, to a predetermined telephone number which, in turn, calls the prepaid air time transaction tracking interface (PATTI). The last four digits of the telephone number are outpulsed from the local exchange company and the PATTI system checks the cellular phone user telephone account using the four digits provided by the local exchange company. If no air time minutes are available or the account is time expired, PATTI does not answer the call and the process is terminated; otherwise PATTI goes off hook and answers the telephone call and communicates with the cellular phone user telling the user how many minutes are available. PATTI then begins to deduct minutes from the cellular phone user's account which continues throughout the call until the cellular phone user is disconnected. PATTI plays a tone which indicates to the cellular phone user that the desired phone number may be entered. PATTI is also programmed to check the phone number to see if the telephone number being called is invalid, and if it is, PATTI disconnects and hangs up on the cellular phone user and terminates the billing; if valid, PATTI seizes an outside telephone line and connects the cellular phone user immediately (the cellular phone user hears ringing, busy signal, answer, etc.). Finally, PATTI terminates all connections when either party hangs up and immediately stops billing the cellular phone user's account.

PATTI requires that the MTSO offer that the calling party pays and the incoming call is blocked; that a roaming restriction on the cellular phone is placed prohibiting the cellular phone user from placing calls outside the home area which otherwise could not be tracked by PATTI; and, most importantly, that hotlining be provided whereby the cellular phone will connect only with the predetermined phone number when the SEND button is pressed regardless of what number has been dialed.

The present invention thus provides a novel and unique system for allowing use of a cellular phone, both without the necessity of purchasing the cellular phone and without engaging a cellular telephone company for the necessary service, whether or not the cellular telephone user has any credit related problems, by providing the user with the cellular phone and the cellular phone service upon prepayment of a predetermined sum by the user.

DESCRIPTION OF THE DRAWINGS

For a better understanding of the invention as well as other objects and further features thereof, references made to the following description which is to be read in conjunction with the accompanying drawings wherein;

FIGS. 2(a)–2(m) are flow charts of the PATTI software program.

DESCRIPTION OF THE INVENTION

Figure 1:
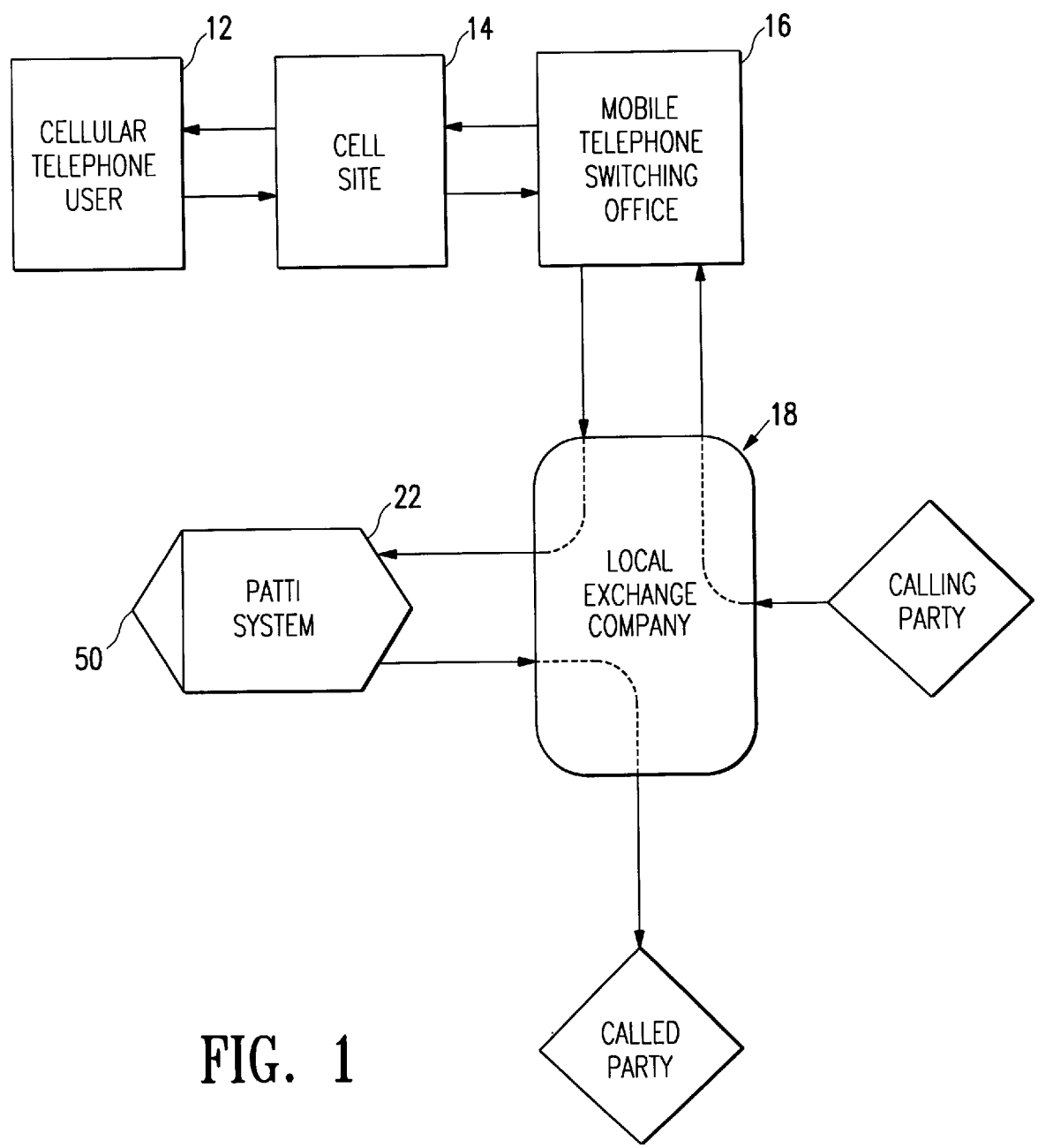
FIG. 1 illustrates a simplified block diagram of the present invention.

Referring now to FIG. 1, a block diagram of the system of the present invention is illustrated. A cellular phone user (CPU) initiates a cellular call to a predetermined number by first pressing the SEND button on the cellular phone 12 regardless of what number is entered (or not entered) in the cellular phone (exception are 911 calls and other specially programmed numbers). The cellular service company receives the call and identifies the phone by a unique electronic serial numbers (ESN) at cell site 14. The cell site is a location containing antenna and radio equipment necessary to complete the talk path between the cellular phone and mobile telecommunications switching office (MTSO) 16. MSTO 16 seizes a telephone line and calls the numbers preprogrammed into its system, the numbers being supplied to the cellular carrier by the PATTI system operator. The preprogrammed number is the direct inward dial (DID)

telephone number assigned to the calling cellular phone. Each cellular phone connects to a single DID telephone number provided by the local exchange company (LEC) 18 which then calls the Prepaid Airtime Transaction Tracking Interface (PATTI) system 22 over a single phone line. PATTI receives the last four digits of the DID telephone cellular phone calling from the LEC to identify the CPU account (PATTI has the capability of prompting the CPU for a password and identify the CPU by the password entered as will be described hereinafter).

The PATTI system, comprising a computer system using a microprocessor 50, such as the Model No. 386DX-25 manufactured by Intel of Santa Clara, Calif., receives the call from the MTSO. The local exchange company provides PATTI with the last four digits of the preprogrammed number that was called. PATTI determines the account information from the four digits received. If the account information passes all the checks, i.e., airtime units are available and the account is not expired, PATTI goes off hook, listens for DTMF digits and answers the CPU telephone call by informing the CPU the available airtime minutes and playing a tone which indicates to the CPU that the desired telephone number can be called. The CPU enters the phone number and PATTI then checks the phone number to see if it is valid (i.e. 900, 976 numbers are typically programmed not valid)—if an invalid number is detected, PATTI disconnects and hangs up on the CPU. If the phone number is valid, PATTI seizes a single outside telephone line connecting the inbound trunk line to the outbound trunk line so that the CPU has a full duplex connection for talk and received audio path and places the call (use of single telephone lines for incoming and outgoing calls enables disconnection by either party). The CPU is connected immediately and hears ringing, a busy signal or answer. PATTI begins to deduct minutes from the CPU's account and continues throughout call until the CPU is disconnected from the cellular telephone, i.e. when either party hangs up. PATTI terminates the call when the CPU or the called party disconnects the line. At this point, the real-time clock stops deducting units from the account of the CPU.

The MTSO is programmed, based on the CPU's choice, to block incoming calls or having the calling party pay (the latter feature is available from a few cellular service companies); to place roaming restrictions on the cellular telephone i.e. this prohibits the CPU from placing calls outside the home area; and for hotlining i.e. when the cellular phone SEND button is pressed, the cellular phone will connect only with the aforementioned predetermined telephone number. The latter feature is necessary for the implementation of the present invention. It should be noted that standard telephone protocols, including software and hardware, are utilized in the PATTI system, including the hotlining feature and the connection/disconnection of the various telephone trunk lines and is not part of the present invention. As will be set forth hereinafter in more detail with reference to FIGS. 2(*a*)–2(*m*), the present invention is directed to the PATTI system which controls the air time use of a cellular phone typically rented or leased by a customer.

FIGS. 2(*a*)–2(*m*) illustrates a software flowchart for the microprocessor 50 shown in FIG. 1 in order to implement the PATTI system as described.

In FIG. 2(*a*), the RESETALL FUNCTION (utilized in FIG. 2(*j*)) clears the old hotline number in the active database from the current D.I.D. line in use (symbol 100). In FIG. 2(*b*), the CHECKALL FUNCTION (utilized in FIG. 2(*j*)) searches all the D.I.D. lines to ascertain if a hotline number is currently active (symbol 102). If a hotline is located (symbol 104), the system is restarted (symbol 106). If not, the hotline number in the current line is placed in the active database (symbol 108).

In FIG. 2(*c*), the caller is advised via the CALLNUMB FUNCTION (utilized in FIG. 2(*e*)) how many prepaid minutes (units) are still available (symbol 200) after the CPU presses the send button on the cellular phone, provides the caller with a dial tone and awaits for the caller to enter a phone number (symbol 201). If the telephone number entered is valid (symbol 202), a local or long distance billing rate is set up depending upon the telephone number dialed (symbol 203). The telecommunication boards are then activated to allow the call to be made (symbol 204) and the CPU proceeds to make the call (symbol 205). If the telephone number entered is not valid (symbol 202), the PATTI system goes to the HANGUP FUNCTION (utilized in FIGS. 2(*e*) and 2(*m*)) causing the CPU to be disconnected (symbol 206).

FIG. 2(*d*) illustrates the flowchart for the CALLCELL FUNCTION (utilized in FIG. 2(*l*)). After the telecommunications boards are set up to make the call (symbol 301) and the call is then made (symbol 302), the software program pauses for about 40 seconds to allow the person called to answer before billing begins (symbol 303). The time of the call and the date thereof (symbol 304) is then established for billing reference purposes.

FIG. 2(*e*) illustrates the REALTIME FUNCTION (utilized in FIG. 2(*m*)), the system monitoring the duration of the call (symbol 401) and then determining which billing formula the CPU should be charged, such as local, long distance or international (symbol 402), the billing rate selected being dependent on where the call is directed. The system then checks to see if the CPU minutes (units) should be deducted (symbol 403). If not, the system returns to the main routine. If yes, the system checks to see from the database whether the caller has any minutes left (symbol 404). If not, the system goes to the HANGUP FUNCTION (symbol 405). If the caller has minutes left, one unit (minute) is deducted from the CPU's account (symbol 406) and the cellular database is updated (symbol 407). A periodic recheck is made to see if CPU has minutes remaining (symbol 408) and if not, the system goes to the HANGUP FUNCTION (symbol 405). If minutes are still available, the system returns to the main routine.

FIG. 2(*f*) illustrates the HANGUP FUNCTION (utilized in FIGS. 2(*l*) and 2(*m*)), the system checking to see if the call duration is less than 59 seconds (symbol 501). If yes, a search is conducted for the hotline number (symbol 502), the available minutes are obtained from the cellular database (symbol 503), and a unit is deducted from the CPU's account (symbol 504). If the call duration is greater than 59 seconds or symbol 504 provides an output, the hotline is checked to see if it is valid (symbol 506). If yes, the LOGIT FUNCTION (see FIG. 2(*h*)) is entered into (symbol 507). If the hotline is not valid or symbol 507 generates an output, the telecommunication boards are reset (symbol 508) and the system restarts.

Referring now to FIG. 2(*g*), the LOGGER FUNCTION (utilized in FIG. 2(*l*)) is illustrated. In essence, an open error log database is established (symbol 601) to store hotline numbers, call numbers, the number dialed, password, date and time. In essence, the LOGGER FUNCTION writes bad password attempts to a database for review by the system administrator personnel to check for unauthorized users.

FIG. 2(*h*) describes the LOGIT FUNCTION (utilized in FIG. 2(*f*)) which establishes the duration of the call and sets the duration equivalent in minutes (symbol 701). The function stores updates to call, log database hotline numbers, numbers dialed, time, date of call, duration and line used.

Figure 2A:
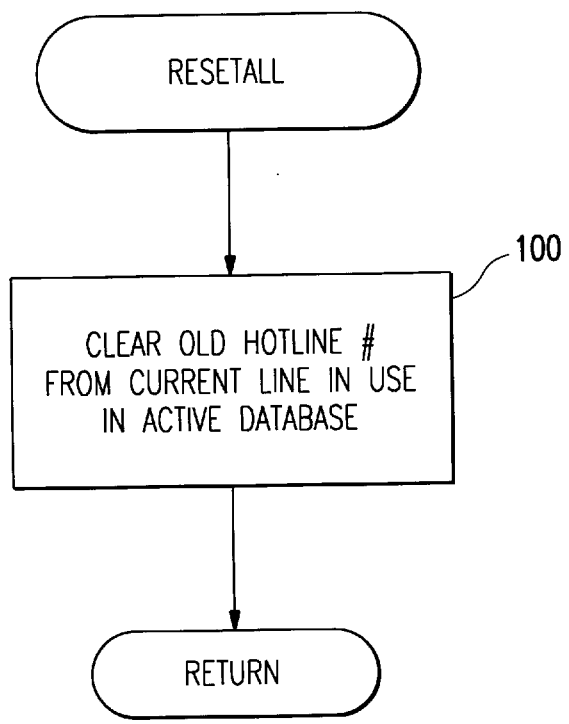
Figure 2B:
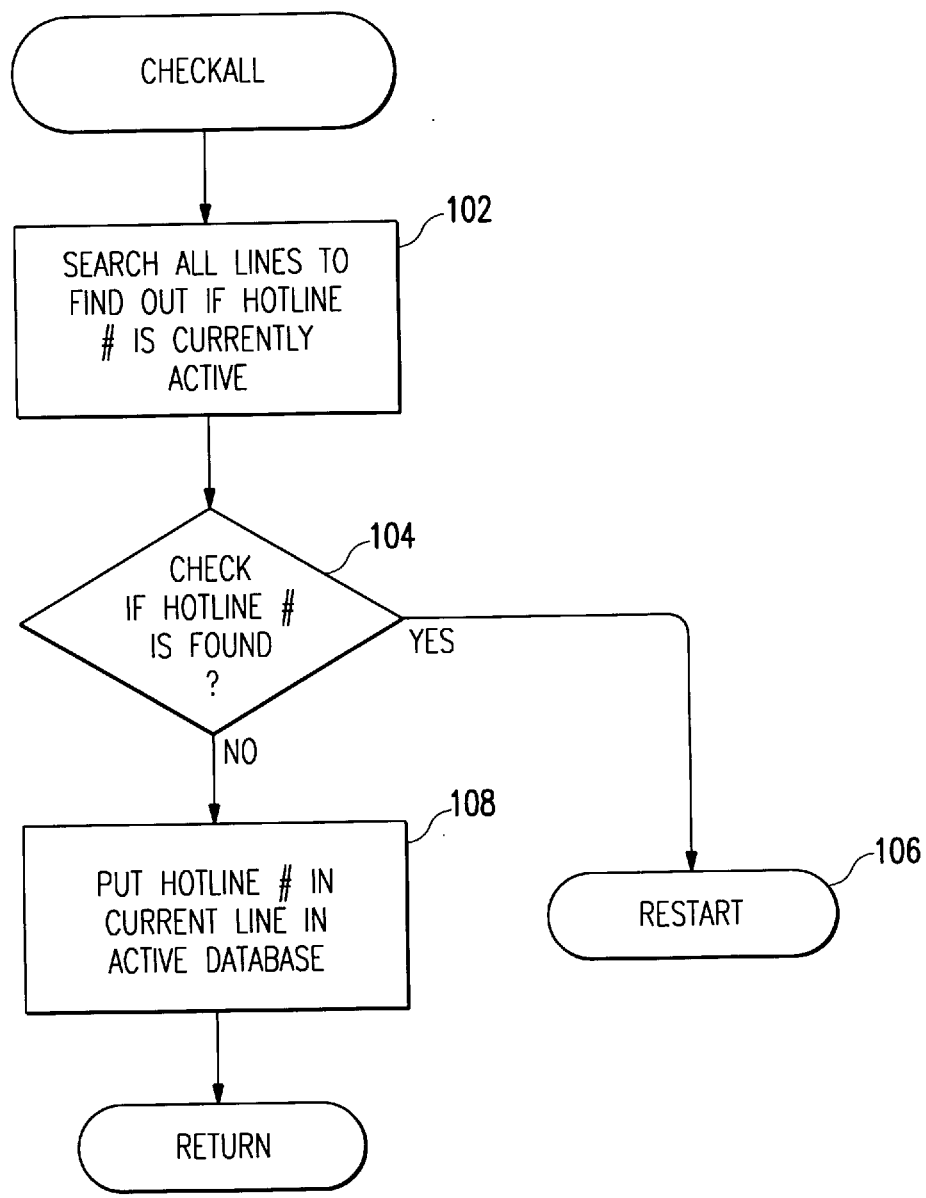
Figure 2D:
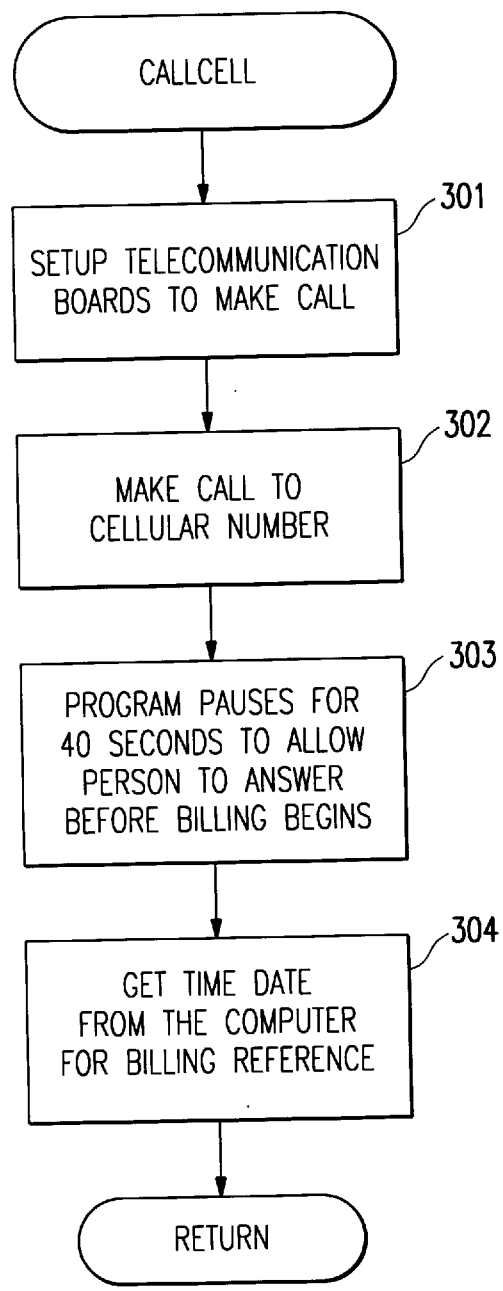
Figure 2E:
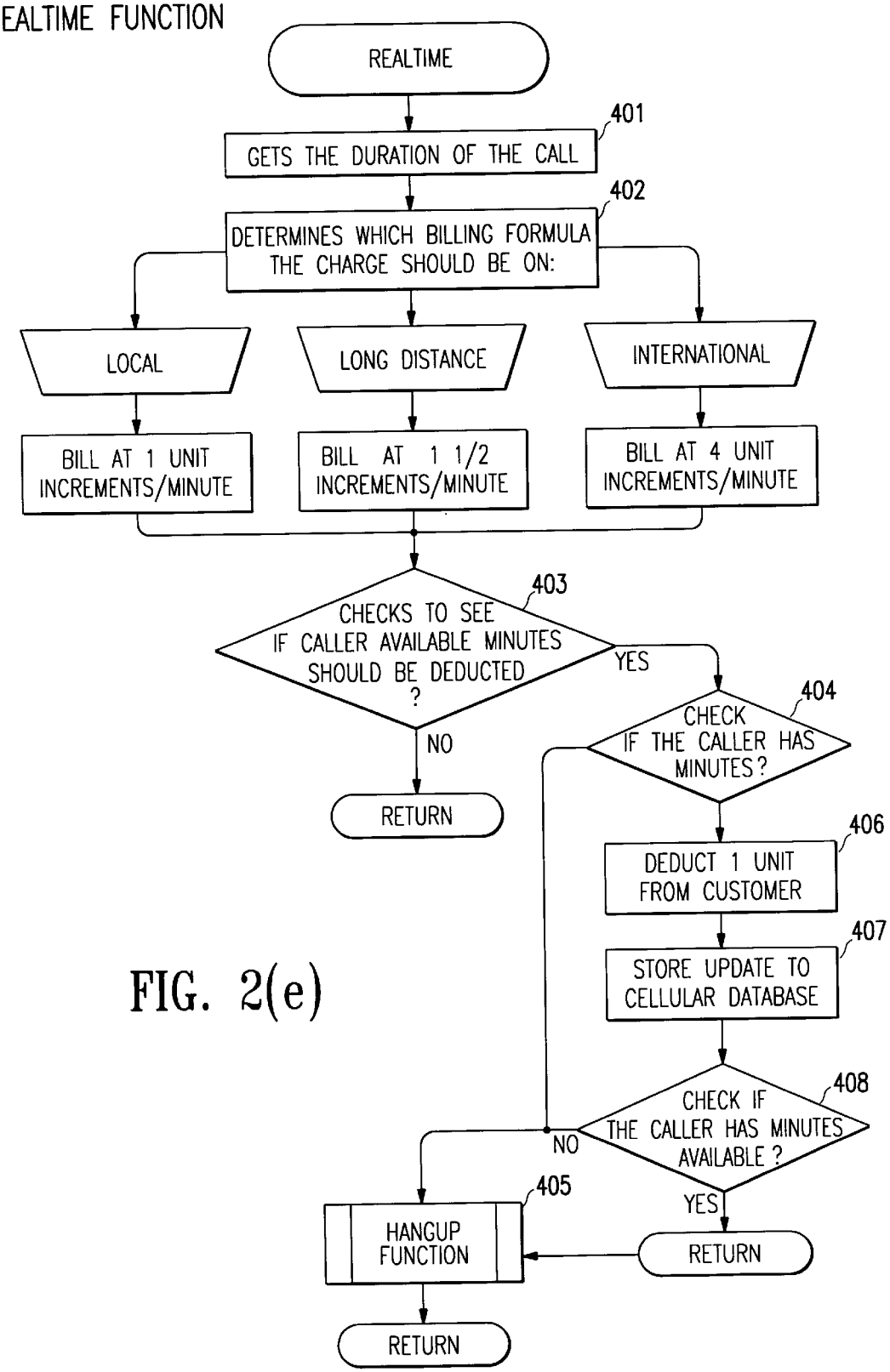
Figure 2F:
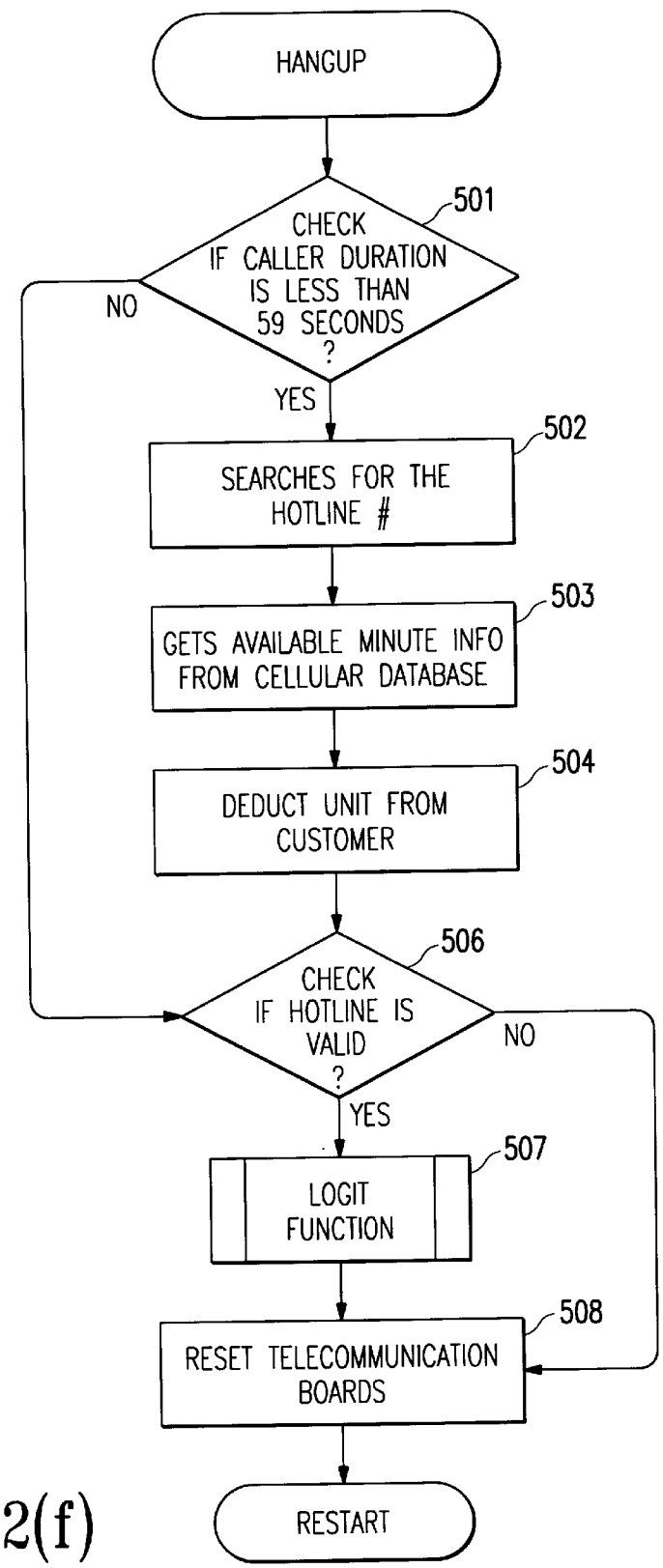
Figure 2G:
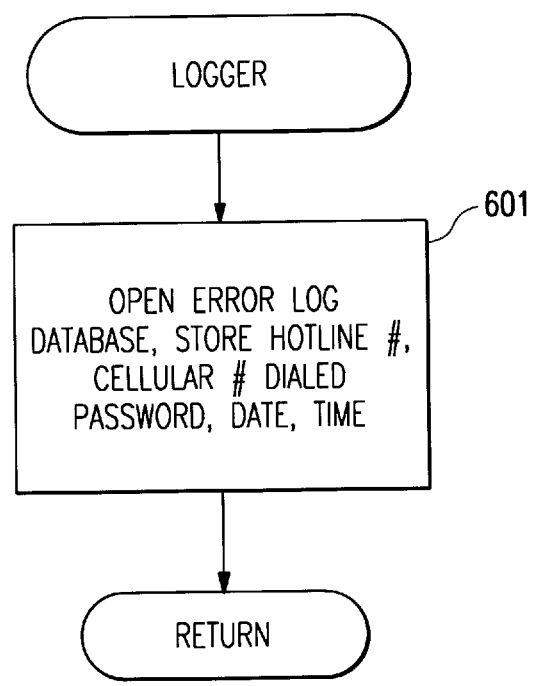
Figure 2H:
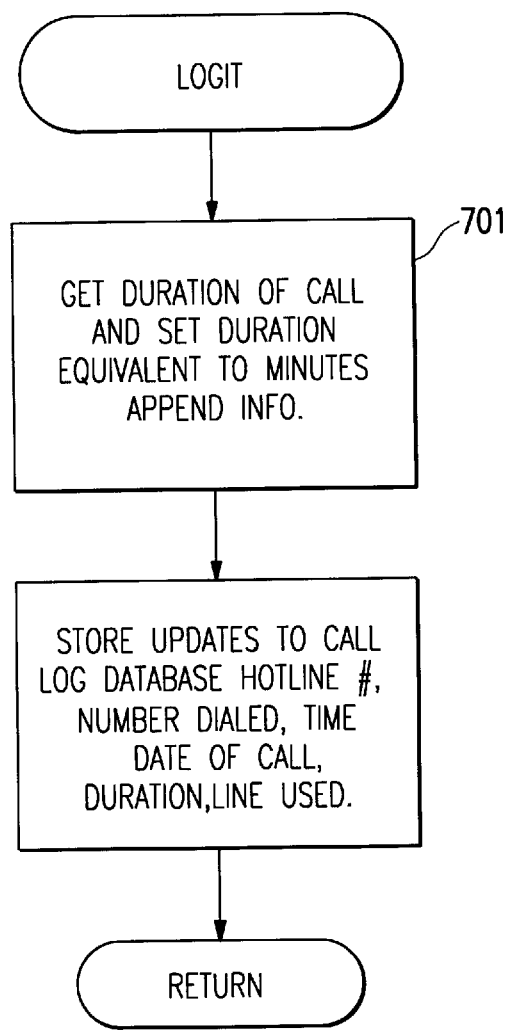
Figure 2I:
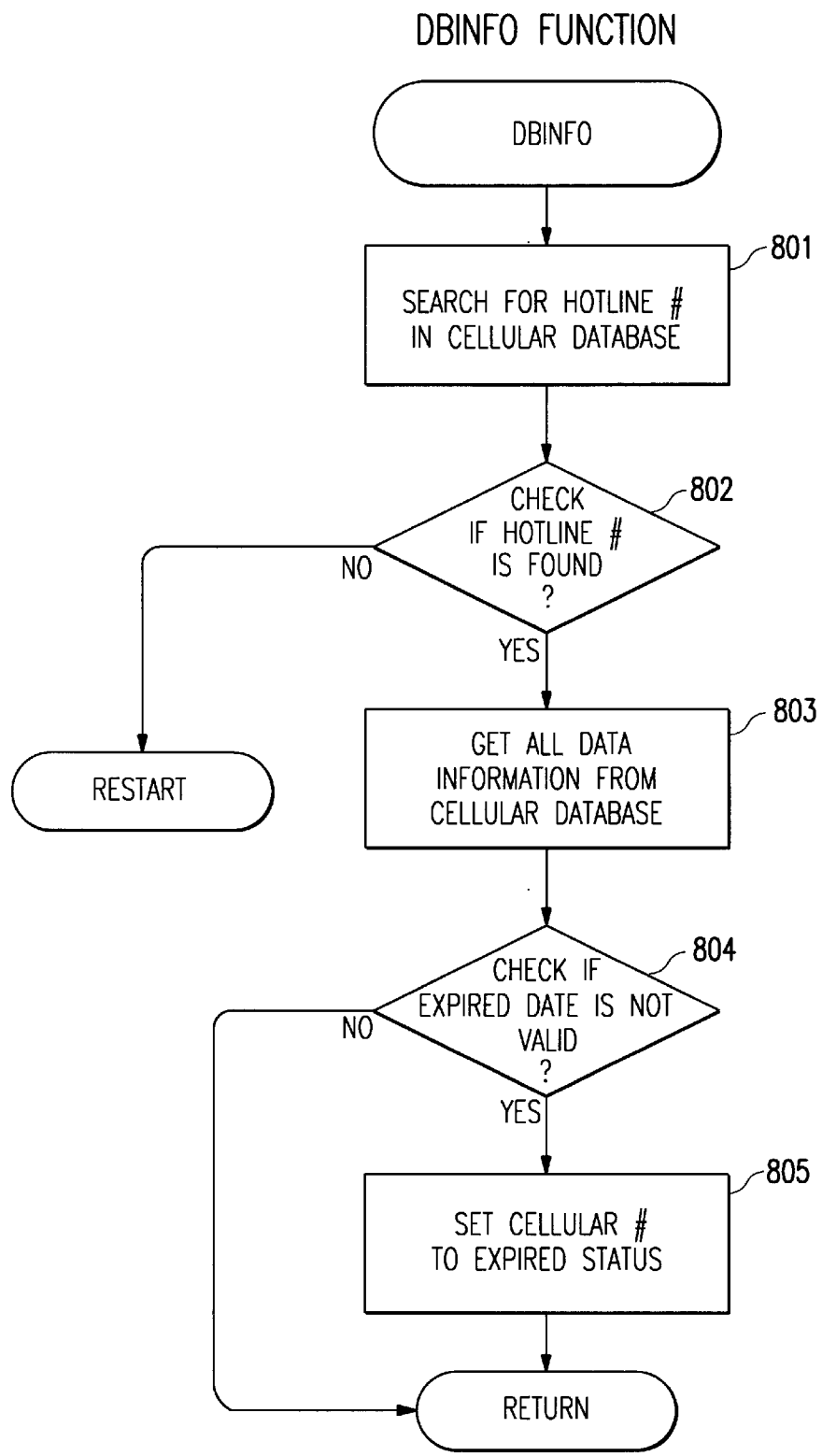
Figure 2J:
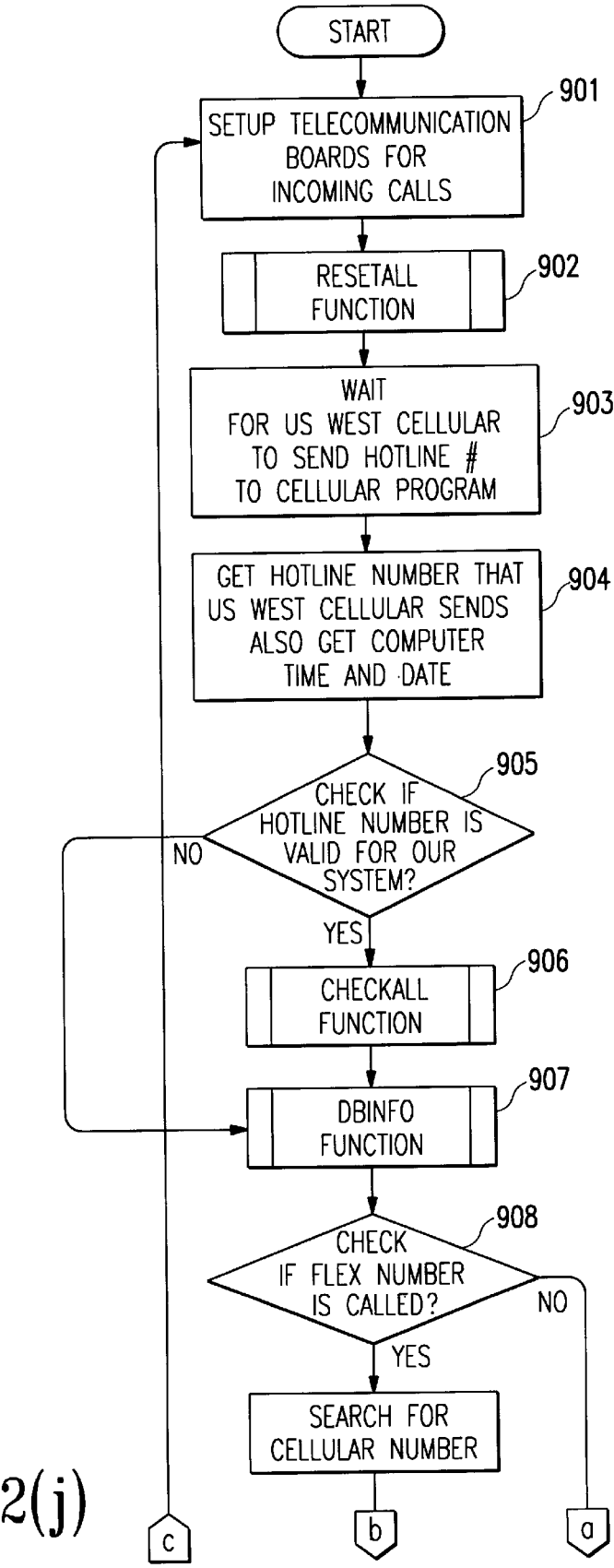
Figure 2K:
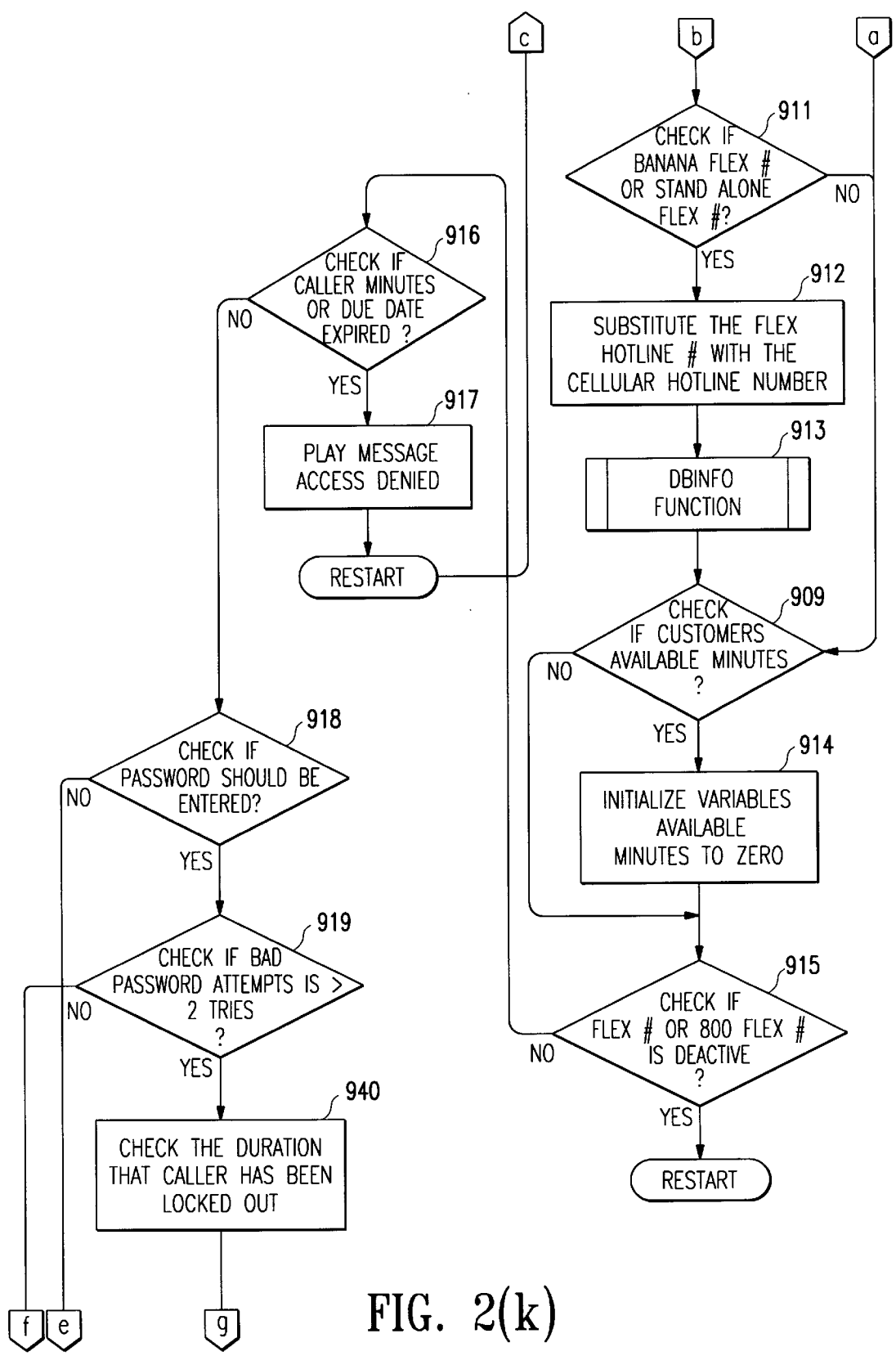
Figure 2I:
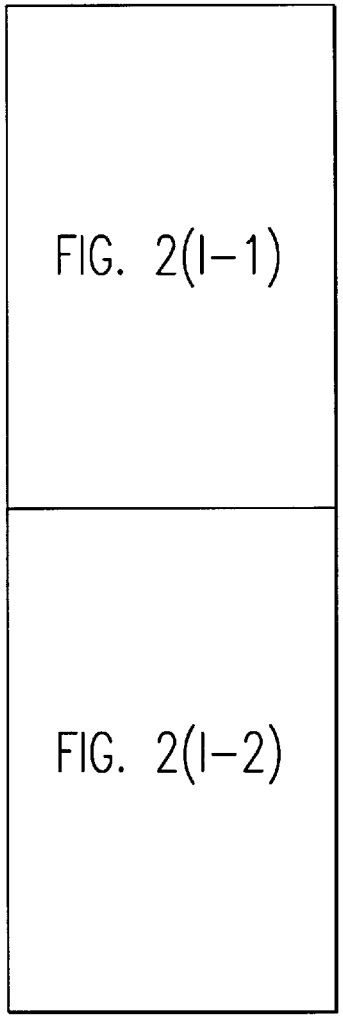
Figure 2M:
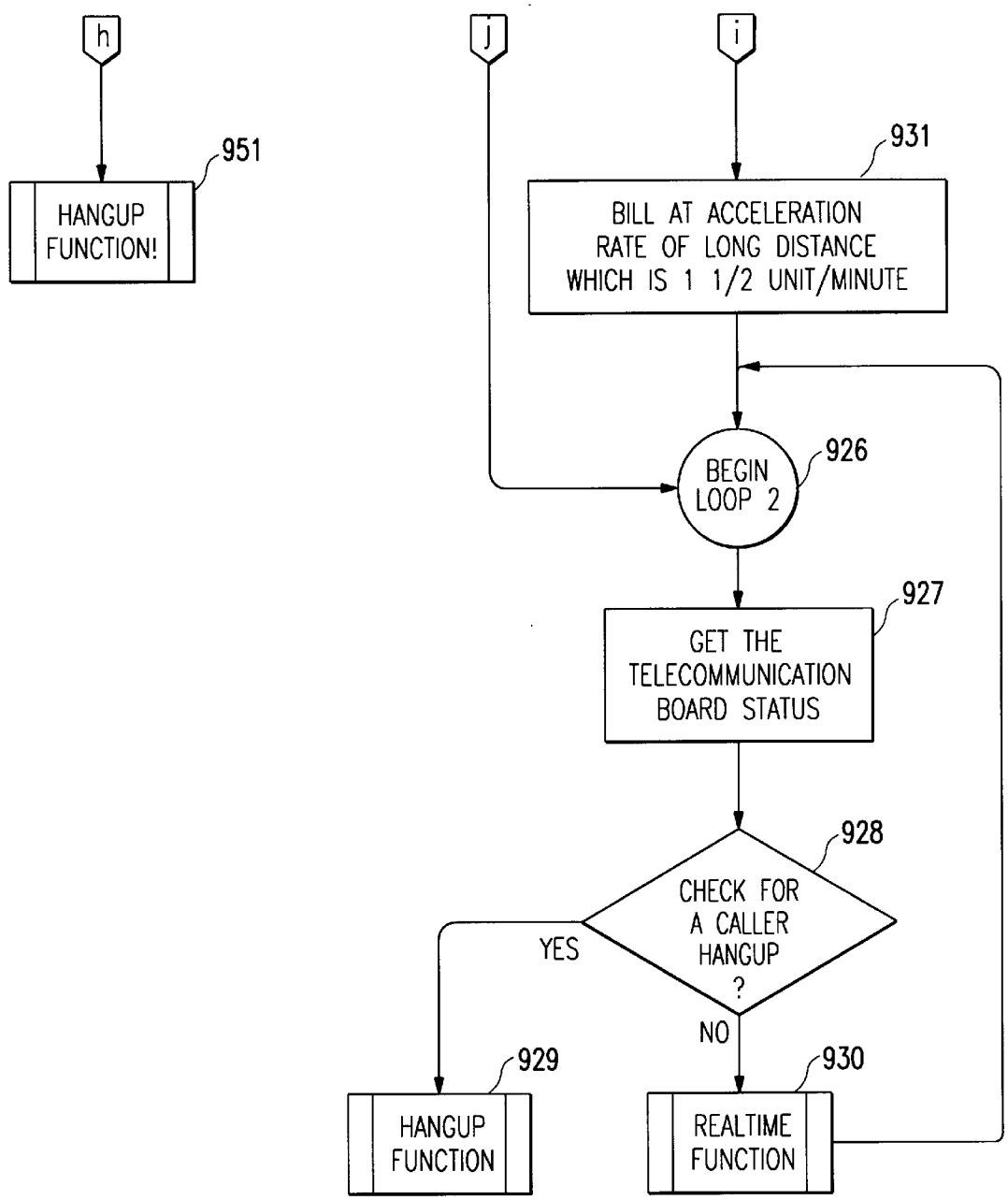

FIG. 2(i) describes the DBINFO FUNCTION (utilized in FIGS. 2(j) and 2(k)). The system searches for the hotline number in the cellular database (symbol 801) and checks to see if a hotline number is found (symbol 802). If not, the system restarts. If yes, all the data information is received from the cellular database (symbol 803) and checked to see if the CPU air time credit has expired (symbol 804). If not, the system routine continues; if yes, the cellular number is set to the expired status (symbol 805) and the system routine continues.

FIGS. 2(j) through 2(m) illustrate the real time billing flowchart for the PATTI cellular network program.

Referring to FIG. 2(j), after the system is initialized, the telecommunication boards are set up for incoming calls (symbol 901); the system then entering the RESETALL FUNCTION (symbol 902). The system then awaits for the local cellular company (i.e. US West Cellular in Arizona) to send the hotline number for the calling CPU to PATTI (symbol 903). After the hotline number is received with time and date (symbol 904) via the local exchange company, the hotline number is checked to see if it is valid. If yes, the CHECKALL FUNCTION is entered into (symbol 906), the output thereof entering into the DBINFO FUNCTION (symbol 907). If the hotline number is not valid, the system jumps to symbol 907 from symbol 905 as illustrated. The system then checks to ascertain if a flex number is called (symbol 908)—if not, the system checks the CPU's available minutes (symbol 909). A flex number call forwards to a cellular number, deducting from the CPU's account. Therefore, if a CPU has a calling party pays option on their phone, the flex number allows people to call the CPU and the CPU incurs the charges for the phone call. The flex hotline is the D.I.D. number i.e. the flex number. If the flex number is called, the cellular number is searched (symbol 910) and checked to see what flex numbers were called (symbol 911). If the specified flex numbers are not called, the system enters symbol 909. If the predetermined flex numbers are called, the flex hotline number is substituted for the cellular hotline number (symbol 912) and then enters the DBINFO FUNCTION (symbol 913). The DBINFO FUNCTION thereafter also enters symbol 909. If there are available minutes for the CPU, variables regarding available numbers are initialized to zero (symbol 914) and then the system checks to see whether the flex number or the 800 flex numbers are active (symbol 915). If there are no available CPU minutes, the function of symbol 915 is entered into directly. If deactive, the system restarts. If active, the system checks whether CPU minutes or due dates have expired (symbol 916). If yes, the message ACCESS DENIED is sent to the CPU (symbol 917) and system restarts. If not, the system checks to see if the password should be entered (symbol 918). If yes, the system checks if the bad entry attempts have exceeded two times (symbol 919). If a password does not have to be entered, the system checks to see if status is a flex call coming in (symbol 920). If yes, the CALL CELL FUNCTION is entered into (symbol 921); if not, the CALLNUMB FUNCTION is entered into (symbol 922). The output of both functions is checked to see if the CPU status is locally billed (symbol 923). If yes, the CPU is billed one unit (symbol 924). If not billed locally and there is an output from symbol 924, the system checks if caller status is billed at a long distance rate of 1.5 units per minute (symbol 925). If not, the system enters the looping point (symbol 926) which then obtains the telecommunication board status (symbol 927). The looping point is the point where the program continually checks for hangups. The system then checks for caller hang up (symbol 928)—if there is a hang up, the system enters the HANGUP FUNCTION (symbol 929). If there is no hang up, the system enters the REALTIME FUNCTION (symbol 930) and re-enters begin loop 2 (symbol 926). If the output of symbol 925 is yes, the system bills at the acceleration rate of long distance rate (1½ units per minutes) (symbol 931) and then proceeds to the steps noted in symbols 926–930.

Referring back to FIG. 2(k), if the output of symbol 919 is yes, the system checks the duration that the CPU has been locked out (symbol 940). If locked out (symbol 941), the message LOCKED OUT is played back to the CPU (symbol 942) and the HANGUP FUNCTION (symbol 943) is entered into. If bad password attempts are less than two times, the tone is played to the CPU to enter the password (symbol 944). This also occurs if CPU is not locked out, the bad password attempts register being reset to a clear status (symbol 945). The system then checks to see if a password has been entered (symbol 946). If not, the system enters the routine starting at 920. If a password is entered, the bad password accumulator is incremented since the CPU had entered a bad password (symbol 947). The telephone line is then checked to see if the CPU entered anything (symbol 948). If not, the system jumps to see if the bad password entries exceed two attempts (symbol 949). If not, the system recycles to the symbol 944 function. If yes, the CPU is provided with the message PASSWORD LOCKOUT (symbol 950) and the system enters the HANG UP FUNCTION (symbol 951).

Referring back to symbol 948, if the CPU entered something, the LOGGER FUNCTION is entered (symbol 952). The bad password attempts in the cellular database is incremented (symbol 953) and the system enters the next routine at symbol 949.

The present invention thus provides a unique system which services both cellular phone users and the industry itself; the former by allowing access to cellular phones wherein such access is currently unavailable and to the latter by extending the market to include a new and potentially larger group of customers.

While the invention has been described with reference to its preferred embodiment, it will be understood by those skilled in the art that various changes may be made and equivalence may be substituted for elements thereof without departing from the true spirit and scope of the invention. In addition, many modifications may be made to adapt to a particular situation or material to the teaching of the invention without departing from its essential teachings.

What is claimed is:

1. A cellular phone communications system wherein a cellular phone user purchases an account having a predetermined amount of air time units prior to initiating any cellular phone calls, the system comprising:

a. a cellular phone for calling a telephone number for causing a first signal to be generated;

b. a cellular switching device, having a cellular port and a telephone exchange port, the cellular switching device being responsive to receiving the first signal, for generating a second signal identifying the cellular phone being utilized and consisting essentially of at least one dual-tone-multi-frequency (DTMF) or multi-frequency (MF) tones, the cellular phone being coupled to the cellular port and being remotely located from the cellular switching device; and c. a tracking interface, responsive to receiving the second signal and coupled by a voice transmission line to the telephone exchange port of the cellular switching device for:

(1) verifying whether the cellular phone identified by the second signal has any air time units available in the account, a return signal being sent to the cellular phone user indicating to the cellular phone user that the number to be called should be entered, (2) checking the telephone number called to see if it is valid, the call being connected to a telephone line if valid, (3) monitoring the call in order to deduct units of air time during the call, the call being terminated when air time units are no longer available.

2. The system as defined in claim 1 wherein the tracking interface terminates the call when the available air time units have expired.

3. The system of claim 2 wherein the tracking interface continuously deducts air time units from the cellular phone user's account during the telephone call.

4. The system of claim 3 wherein the cellular switching device prevents the cellular phone user from placing calls outside predetermined geographic areas.

5. The system of claim 1 wherein the cellular phone has a plurality of information entry areas, including a SEND area, that can be activated, and wherein the cellular switching device allows the cellular phone to be connected with a predetermined phone number when the SEND area is initially activated regardless of what calling number has been entered into the cellular phone.

6. The system of claim 3 wherein the tracking interface ceases to deduct air time units from the cellular phone user's account when the call is terminated.

7. A method for controlling the use of a cellular phone when the cellular phone user purchases a predetermined amount of air time units prior to initiating any cellular phone call, the method comprising the steps of:

a. generating a first signal by a cellular phone;

b. receiving the first signal by a cellular switching device having a cellular port and a telephone exchange port, the cellular phone being coupled to the cellular port and being remotely located from the cellular switching device;

c. generating a second signal by the cellular switching device in response to receiving the first signal, the second signal identifying the cellular phone being utilized and consisting essentially of at least one dual-tone-multi-frequency (DTMF) or multi-frequency (MF) tone;

d. receiving the second signal by a tracking interface device coupled by a voice transmission line to the telephone exchange port of the cellular switching device;

e. verifying, by the tracking interface device, whether the cellular phone identified by the second signal has any air time units available;

f. sending a return signal to the cellular phone user indicating that the number to be called should be entered so that the cellular phone user can make a cellular phone call; and g. monitoring the cellular phone call by the tracking interface device and continuously deducting the cellular phone user's air time units while the cellular phone call is in progress.

8. The method of claim 7 further including the steps of verifying that the number being called is valid and connecting the cellular phone to a telephone line if the number is valid.

9. The method of claim 8 further including the steps of monitoring the connected telephone line by the tracking interface device in order to deduct air time units during the call and terminating the call when air time units are no longer available.

10. The method of claim 9 including the step of terminating the phone call if the time period to use the available air time units has expired.

11. The method of claim 7 further including the step of continuously deducting air time units by the tracking interface device from the cellular phone user's account during the telephone call.

12. The method of claim 11 including the step of preventing the cellular phone user from placing calls outside a predetermined geographic area.

13. The method of claim 7 further including the step of connecting the cellular phone only with a predetermined phone number when a SEND area on the cellular phone is activated regardless of what calling number has been entered into the cellular telephone.

14. The method of claim 13 including the step of initiating deduction of air time units from the cellular phone user's account when the cellular phone user or the called party terminates the call.

15. A cellular phone communications system including at least one cellular phone and a cellular switching device, the cellular switching device having a cellular port and a telephone exchange port, wherein a cellular phone user purchases an account for a cellular phone, the account having a predetermined amount of air time units prior to initiating any cellular phone calls, the cellular phone causing a first signal to be generated, the first signal being received by the cellular switching device, the system comprising:

a. a tracking interface device, coupled by a voice transmission line to the telephone exchange port of the cellular switching device, for:

(1) receiving a second signal from the cellular switching device in response to the cellular switching device receiving the first signal from the cellular phone via the cellular port, the cellular switching device being remotely located from the cellular phone, the second signal identifying the cellular phone being used by the cellular phone user and consisting essentially of at least one dual-tone-multi-frequency (DTMF) or multi-frequency (MF) tone;

(2) determining whether the predetermined amount of air time units in the cellular phone user's account have been exhausted;

(3) if the predetermined amount of air time units have not been exhausted, authorizing the cellular phone user to make a cellular call, and (4) monitoring the cellular call being made by the cellular phone user in order to continuously deduct units of air time from the cellular phone user's account while the cellular call is in progress.

16. The system of claim 15 wherein the tracking interface device does not authorize the cellular phone user to make a cellular call if the predetermined amount of air time units have been exhausted.

17. The system of claim 15 wherein the return signal indicates to the cellular phone user how many air time units are remaining in the cellular phone user's account.

18. The system of claim 15 wherein the tracking interface unit determines whether the cellular phone user has entered a valid phone number on the cellular phone in order to make the cellular call.

19. A cellular phone communications system including at least one cellular phone and a cellular switching device, the cellular switching device having a cellular port and a telephone exchange port, wherein a cellular phone user purchases an account for a cellular phone, the account having a predetermined amount of air time units prior to initiating any cellular phone calls, the cellular phone causing a first signal to be generated, the first signal being received by the cellular switching device, the system comprising:

a. a tracking interface, coupled by a voice transmission line to the telephone exchange port of the cellular switching device, for:
 (1) receiving a second signal from the cellular switching device in response to the cellular switching device receiving the first signal from the cellular phone via the cellular port, the cellular switching device being remotely located from the cellular phone, the second signal identifying the cellular phone being used by the cellular phone user and consisting essentially of at least one dual-tone-multi-frequency (DTMF) or multi-frequency (MF) tone;
 (2) determining whether the predetermined amount of air time units in the cellular phone user's account have been exhausted;
 (3) authorizing the cellular phone user to make a cellular call if the predetermined amount of air time units have not been exhausted; and
 (4) monitoring the cellular call being made by the cellular phone user in order to deduct units of air time from the cellular phone user's account while the cellular call is in progress.

20. The system of claim 19 wherein the tracking interface is further for terminating the cellular call if the air time units in the cellular phone user's account have been exhausted.

21. A method for controlling the use of a cellular phone when a cellular phone user purchases an account having at least one air time unit prior to initiating any cellular phone call to a called party, the method comprising the steps of:

a. generating a first signal by a cellular phone;
b. receiving the first signal by a cellular switching device having a cellular port and a telephone exchange port, the cellular phone being coupled to the cellular port and being remotely located from the cellular switching device;
c. generating a second signal by the cellular switching device in response to receiving the first signal, the second signal identifying the cellular phone being utilized and consisting essentially of at least one dual-tone-multi-frequency (DTMF) or multi-frequency (MF) tone;
d. receiving the second signal by a tracking interface device coupled by a voice transmission line to the telephone exchange port of the cellular switching device;
e. determining, by the tracking interface device, whether the cellular phone identified by the second signal has any air time units available;
f. connecting the cellular phone user to the called party for a cellular phone call, if the tracking interface device determines that the cellular phone has at least one available air time unit; and
g. monitoring the cellular phone call and continuously deducting air time units from the cellular phone user's account while the cellular phone call is in progress.

22. The method of claim 21, further comprising terminating the cellular phone call when the cellular phone user has exhausted the air time units in the account.

23. The method of claim 22, further comprising sending a third signal from the tracking interface device to the cellular phone user indicating that the cellular phone user can make the cellular phone call if the tracking interface device determines that the cellular phone user's account has at least one available air time unit.

24. A cellular phone communications system wherein a cellular phone user purchases an account having a predetermined amount of air time units prior to initiating any cellular phone calls, the system comprising:

a. a cellular phone for calling a telephone number for causing a first signal to be generated;
b. a cellular switching device configured to call a predetermined number when the cellular switching device receives the first signal, the cellular switching device having a cellular port and a telephone exchange port, the cellular switching device being responsive to receiving the first signal, for generating a second signal identifying the cellular phone being utilized and consisting essentially of at least one dual-tone-multi-frequency (DTMF) or multi-frequency (MF) tone, the cellular phone being coupled to the cellular port and being remotely located from the cellular switching device; and
c. a tracking interface, responsive to receiving the second signal and coupled by a voice transmission line to the telephone exchange port of the cellular switching device, the predetermined number corresponding to the tracking interface, such that the cellular switching device need only establish a connection with the tracking interface after the first signal is received by the cellular switching device, the tracking interface for:
 (1) verifying whether the cellular phone identified by the second signal has any air time units available in the account, a return signal being sent to the cellular phone user indicating to the cellular phone user that the number to be called should be entered,
 (2) checking the telephone number called to see if it is valid, the call being connected to a telephone line if valid,
 (3) monitoring the call in order to deduct units of air time during the call, the call being terminated when air time units are no longer available.

25. A method for controlling the use of a cellular phone when the cellular phone user purchases a predetermined amount of air time units prior to initiating any cellular phone call, the method comprising the steps of:

a. generating a first signal by a cellular phone;
b. receiving the first signal by a cellular switching device configured to call a predetermined number when the cellular switching device receives the first signal, the cellular switching device having a cellular port and a telephone exchange port, the cellular phone being coupled to the cellular port and being remotely located from the cellular switching device;
c. generating a second signal by the cellular switching device in response to receiving the first signal, the second signal identifying the cellular phone being utilized and consisting essentially of at least one dual-tone-multi-frequency (DTMF) or multi-frequency (MF) tone;
d. receiving the second signal by a tracking interface device coupled by a voice transmission line to the telephone exchange port of the cellular switching device, the predetermined number corresponding to the tracking interface, such that the cellular switching device need only establish a connection with the tracking interface after the first signal is received by the cellular switching device;

e. verifying, by the tracking interface device, whether the cellular phone identified by the second signal has any air time units available;

f. sending a return signal to the cellular phone user indicating that the number to be called should be entered so that the cellular phone user can make a cellular phone call; and g. monitoring the cellular phone call by the tracking interface device and continuously deducting the cellular phone user's air time units while the cellular phone call is in progress.

26. A cellular phone communications system including at least one cellular phone and a cellular switching device, the cellular switching device having a cellular port and a telephone exchange port, wherein a cellular phone user purchases an account for a cellular phone, the account having a predetermined amount of air time units prior to initiating any cellular phone calls, the cellular phone causing a first signal to be generated, the first signal being received by the cellular switching device, the system comprising:

a. a tracking interface device, coupled by a voice transmission line to the telephone exchange port of the cellular switching device, the tracking interface device corresponding to a predetermined number that is called by the cellular switching device when the cellular switching device receives the first signal, such that the cellular switching device need only establish a connection with the tracking interface after the first signal is received by the cellular switching device, the tracking interface for:

(1) receiving a second signal from the cellular switching device in response to the cellular switching device receiving the first signal from the cellular phone via the cellular port, the cellular switching device being remotely located from the cellular phone, the second signal identifying the cellular phone being used by the cellular phone user and consisting essentially of at least one dual-tone-multi-frequency (DTMF) or multi-frequency (MF) tone;

(2) determining whether the predetermined amount of air time units in the cellular phone user's account have been exhausted;

(3) if the predetermined amount of air time units have not been exhausted, authorizing the cellular phone user to make a cellular call; and (4) monitoring the cellular call being made by the cellular phone user in order to continuously deduct units of air time from the cellular phone user's account while the cellular call is in progress.

27. A cellular phone communications system including at least one cellular phone and a cellular switching device, the cellular switching device having a cellular port and a telephone exchange port, wherein a cellular phone user purchases an account for a cellular phone, the account having a predetermined amount of air time units prior to initiating any cellular phone calls, the cellular phone causing a first signal to be generated, the first signal being received by the cellular switching device, the system comprising:

a. a tracking interface, coupled by a voice transmission line to the telephone exchange port of the cellular switching device, the tracking interface device corresponding to a predetermined number that is called by the cellular switching device when the cellular switching device receives the first signal, such that the cellular switching device need only establish a connection with the tracking interface after the first signal is received by the cellular switching device, the tracking interface for:

(1) receiving a second signal from the cellular switching device in response to the cellular switching device receiving the first signal from the cellular phone via the cellular port, the cellular switching device being remotely located from the cellular phone, the second signal identifying the cellular phone being used by the cellular phone user and consisting essentially of at least one dual-tone-multi-frequency (DTMF) or multi-frequency (MF) tone;

(2) determining whether the predetermined amount of air time units in the cellular phone user's account have been exhausted;

(3) authorizing the cellular phone user to make a cellular call if the predetermined amount of air time units have not been exhausted; and (4) monitoring the cellular call being made by the cellular phone user in order to deduct units of air time from the cellular phone user's account while the cellular call is in progress.

28. A method for controlling the use of a cellular phone when a cellular phone user purchases an account having at least one air time unit prior to initiating any cellular phone call to a called party, the method comprising the steps of:

a. generating a first signal by a cellular phone;

b. receiving the first signal by a cellular switching device configured to call a predetermined number when the cellular switching device receives the first signal, the cellular switching device. The cellular switching device having a cellular port and a telephone exchange port, the cellular phone being coupled to the cellular port and being remotely located from the cellular switching device;

c. generating a second signal by the cellular switching device in response to receiving the first signal, the second signal identifying the cellular phone being utilized and consisting essentially of at least one dual-tone-multi-frequency (DTMF) or multi-frequency (MF) tone;

d. receiving the second signal by a tracking interface device coupled by a voice transmission line to the telephone exchange port of the cellular switching device, the predetermined number corresponding to the tracking interface, such that the cellular switching device need only establish a connection with the tracking interface after the first signal is received by the cellular switching device;

e. determining, by the tracking interface device, whether the cellular phone identified by the second signal has any air time units available;

f. connecting the cellular phone user to the called party for a cellular phone call, if the tracking interface device determines that the cellular phone has at least one available air time unit; and g. monitoring the cellular phone call and continuously deducting air time units from the cellular phone user's account while the cellular phone call is in progress.

* * * * *